March 3, 1970 G. KERN 3,498,013
APPARATUS FOR ANCHORING PRESTRESSING MEMBERS IN
PRESTRESSED CONCRETE
Filed June 9, 1967 2 Sheets-Sheet 1

INVENTOR
Georg KERN

BY
AGT.

INVENTOR.
Georg KERN

United States Patent Office 3,498,013
Patented Mar. 3, 1970

3,498,013
APPARATUS FOR ANCHORING PRESTRESSING MEMBERS IN PRESTRESSED CONCRETE
Georg Kern, Munich, Germany, assignor to Dyckerhoff & Widmann Kommanditgesellschaft, Munich, Germany
Filed June 9, 1967, Ser. No. 644,841
Claims priority, application Germany, June 13, 1966, D 50,303
Int. Cl. E04c 3/10, 3/26, 5/08
U.S. Cl. 52—225                                          8 Claims

ABSTRACT OF THE DISCLOSURE

Anchoring means for prestressing members in prestressed concrete, including an abutment member to be embedded in concrete, a tubular anchoring body having an externally threaded end portion receiving a nut for engaging the abutment member and having an internally threaded portion which receives a disk provided with apertures through which extend the threaded ends of anchoring rods secured in said anchoring body by nuts seated against the disk from the inside.

SUMMARY OF THE INVENTION

The invention relates to apparatus for anchoring prestressing members in prestressed concrete.

More in particular, the invention provides apparatus for anchoring prestressing members in prestressed concrete, which comprises fixing means adapted to be secured to a plurality of prestressing members, such as rods, and a body member connected to the fixing means and adapted to be movable relative to the concrete to stress the said prestressing members, the said fixing means having adjusting means for separately adjusting the position of each prestressing member relative to the fixing means in the direction of stress and the body member being provided with means for holding it in position relative to the concrete to maintain the required stress.

In a preferred embodiment the said adjusting means includes a plurality of screw threaded members arranged to engage screw threaded parts of respective prestressing members in the form of rods or the like. Advantageously the apparatus includes prestressing members which each comprise a rod screw threaded at least adjacent one end and said fixing means includes a plate member provided with a plurality of apertures through each of which passes one end of one said rod, and the adjusting means comprises a plurality of screw threaded nuts each engaging the screw threaded end of one rod projecting through the plate.

Preferably the body member is externally screw threaded along at least part of its length and a screw threaded nut is mounted externally on the said part of the length of the body member for holding the body member in position in relation to the concrete, the nut being rotatable to move the body member relative to the concrete and thereby adjust the tension in the prestressing members.

In the preferred embodiment of the invention a cylindrical collar surrounds the body member and is adapted to be at least partially set into the concrete, the collar having a dished abutment face providing a recessed seat for receiving a tapered abutment face on the nut surrounding the body member. Advantageously the body member comprises a hollow tubular member having the said fixing means removably secured in one end.

The fixing means comprises a circular plate member screw threadedly engaged in one end of the bore in the tubular member. In a practical embodiment the apparatus includes an odd number of prestressing rods each secured at one end to the fixing means.

The invention includes prestressed concrete including a plurality of stressed members passing through the concrete to prestress it, the ends of the stressed members being secured by anchoring apparatus as aforesaid to maintain the stressed members under stress.

The invention also provides apparatus for anchoring bar reinforcements for prestressed concrete by means of an anchor nut which bears on the concrete by way of a domed abutment member set in the concrete, which apparatus comprises a plurality of steel bars screw threaded at least at their ends and anchored by nuts on the inside of an end member of a hollow anchoring member, the end member being formed with apertures through which the bars extend, the anchorage member having an external screw thread adapted to receive an anchor nut to bear against the said abutment member. Advantageously an odd number of steel bars are provided.

BRIEF DESCRIPTION OF THE DRAWINGS

Further objects and advantages of the invention will become apparent from the following description with reference to the accompanying drawings which illustrate one embodiment, and in which.

DESCRIPTION OF THE INVENTION

Figure 1:
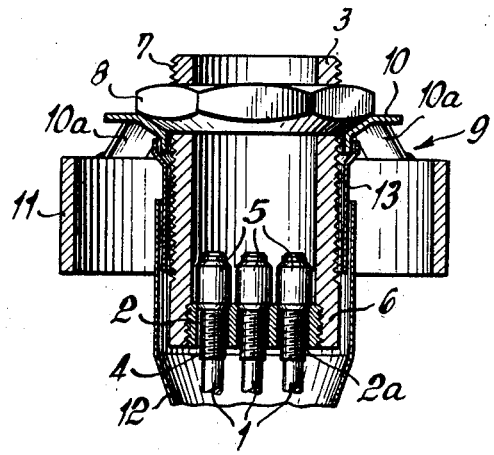
FIGURE 1 is a section through an anchoring device.
Figure 2:
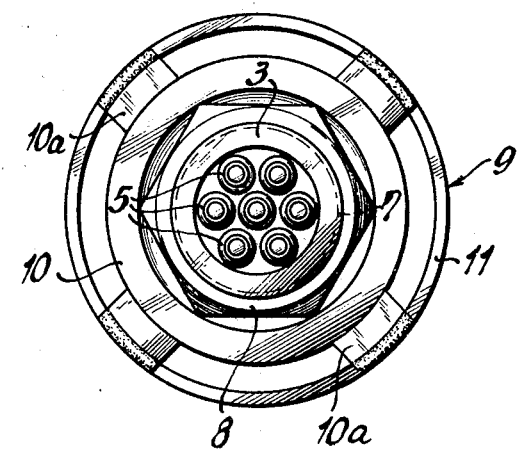
FIGURE 2 is a plan view of the anchoring device.
Figure 3:
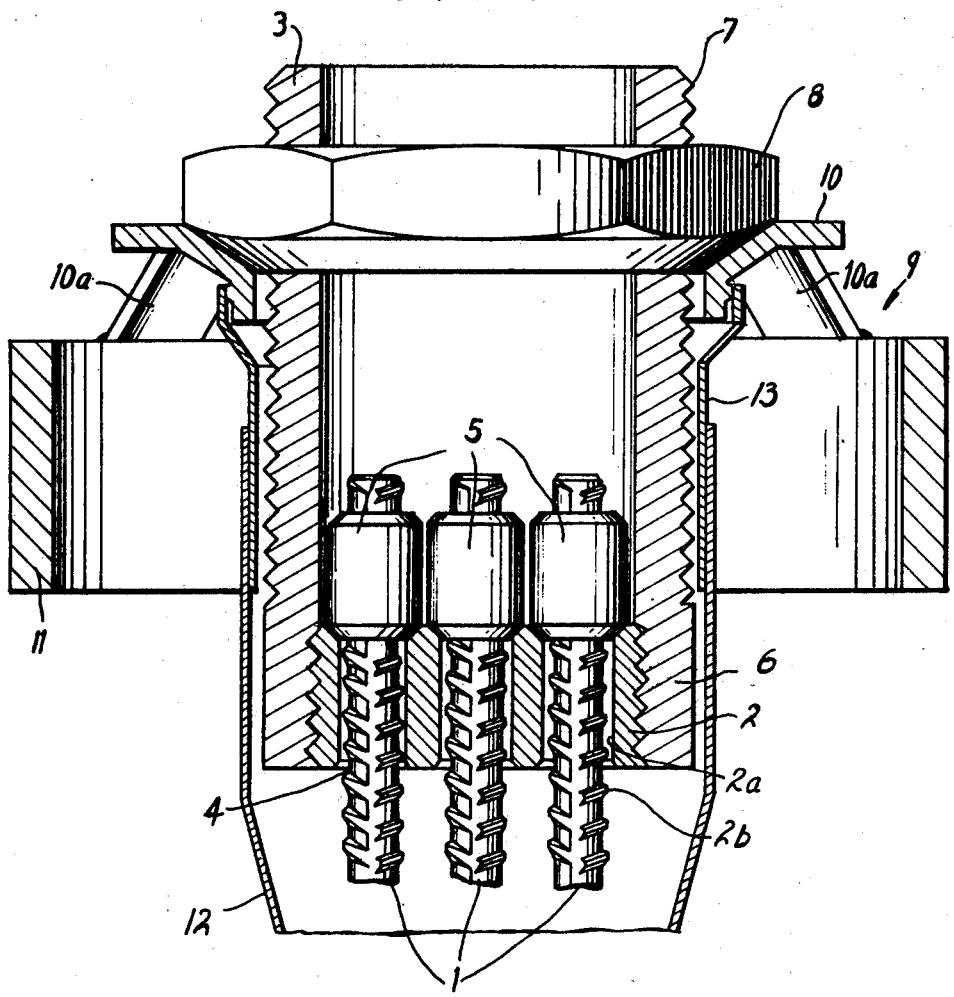
FIGURE 3 is a section similar to FIG. 1 drawn to an enlarged scale and showing the tendons with hot rolled helical ribs forming parts of a screw thread.

In the anchoring device of this example seven prestressing members in the form of rod-like tendons 1 are secured in a plate-like base or end member 2 of a hollow cylindrical anchorage member 3. In the example shown, the rods or tendons 1 have rolled screw threads at their ends 4. Advantageously, however, the tendons may have hot-rolled helical ribs 2b which form parts of a screw thread along their whole length. The ends of the tendons 1 are pushed through orifices 2a in the end or base member 2 and are secured on the inside by anchor nuts 5 which are conical on their end faces to ensure satisfactory seating against the end member 2.

Nuts, such as nuts 5 shown herein, having internal threads used with the hot rolled helical ribs 2b are commercially available, and applicant does not consider them a part of his invention.

The end or base member 2 of the anchorage member 3 has on its periphery an external screw thread enabling it to be screwed into an internal screw thread at the bottom end 6 of the member 3. The member 3 has at the top an external screw thread 7 whose length is adequate to allow for the tendon extension which occurs when the rods or tendons are stressed. An anchor nut 8 can be screwed onto the external screw threads 7 and the anchor nut bears at its conical underside against a corresponding recess in an abutment member 9.

The abutment member 9 comprises a dome shaped member 10, serving as an abutment for the nut 8, and an annular part 11 which is formed as part of a hollow cylinder and which is adapted to be embedded in the concrete in order to transmit thrust to the concrete. The member 10 is connected to the part 11 by a plurality of spaced arm members 10a. A cover tube 12 and sealing member 13 is provided around the anchorage member 3.

It will be seen that the above example enables very high stressing forces to be introduced into the concrete by means of a single stressing operation, as a plurality of rods are combined and attached to one anchoring device. By using a plurality of bars, the required tension may be achieved although the diameter of each bar remains small enough to allow the bars to be of satisfactory quality.

An advantage of the anchoring of the above example is that each individual bar of a bunch can, by means of the anchor nut 5 which locates the bar relative to the end member 2 of the anchor part 3, be accurately adjusted to the length which the bar is required to have so that individual bars are not overstressed.

It is particularly advantageous to use in the above example reinforcing bars having hot-rolled ribs which extend helically and form a screw thread adapted to receive an anchorage member having a matching screw thread. Since such steel bars have screw threading over their entire length, the material can be delivered, e.g., in rolls, and cut off to the required final dimensions on the building site. Also, the ribbed nature of the rod surface ensures that, in the case of post-tensioned prestressed concrete, the various bars must remain separated from one another as they extend through the cover tube, so that the injection mortar can enter and be distributed without hindrance.

Having now described my invention with reference to the embodiment illustrated in the drawings, I do not wish to be limited thereto, but what I desire to protect by Letters Patent of the United States is set forth in the appended claims.

I claim:

1. Apparatus for anchoring prestressing members in prestressed concrete comprising, an anchoring means, fixing means movably supported by said anchoring means and including a body member and an end member, said end member having a plurality of apertures and being supported in one end of said body member, a plurality of threaded ends of prestressing members each associated with one said aperture, individual adjusting means including an internally threaded member for each of said threaded ends of prestressing members for separately adjusting the position of each prestressing member relative to said end member, and common adjusting means for adjusting the position of said body member relative to said anchoring member.

2. Apparatus as set forth in claim 1, where the prestressing members are rods provided with external threads over at least a portion thereof.

3. Apparatus in accordance with claim 1, where said common adjusting means includes said body member with said end member, said body member being disposed in said anchoring means and having an external thread on at least the other end thereof, and a threaded nut being received on said external thread for moving said body member relative to said anchoring means and for holding said body member in position in relation to the concrete.

4. Apparatus in accordance with claim 3, where said anchoring means is defined by an abutment member comprising a cylindrical collar disposed around said body member, an annular part disposed around said collar and connected thereto to form an anchoring unit adapted to be at least partially set in concrete, and a dished portion intermediate said cylindrical collar and said annular part, said threaded nut being received on said body member in said dished portion.

5. Apparatus in accordance with claim 1, where said anchoring means is defined by an abutment member comprising a cylindrical collar disposed around said body member, an annular part disposed around said collar and connected thereto to form an anchoring unit adapted to be at least partially set in concrete, and a dished portion intermediate said cylindrical collar and said annular part.

6. Apparatus in accordance with claim 1, where said body member is a hollow tubular member and said end member is threadedly and removably secured in said one end of said body member.

7. Apparatus in accordance with claim 1, where said end member is a circular member having external threads in engagement with said one end of said body member.

8. Apparatus for anchoring reinforcing bars for prestressed concrete comprising an abutment member set in the concrete, an anchor nut disposed on and adapted to bear against said abutment member, a body member having an externally threaded portion at one end extending through said abutment member for threaded engagement with said anchor nut and having an internally threaded portion at the other end, an externally threaded end member threadedly mounted in said internally threaded end portion, said end member having a plurality of apertures, a plurality of anchoring rods having threaded end portions and a plurality of nuts, each associated with one aperture for threadedly engaging the end portion of one said rod.

References Cited

UNITED STATES PATENTS 3,327,380    6/1967    Howlett _____ 52—230

FOREIGN PATENTS 1,379,706    10/1964    France.

FRANK L. ABBOTT, Primary Examiner
JAMES L. RIDGILL, Jr., Assistant Examiner

U.S. Cl. X.R.

52—230